Figure 1:
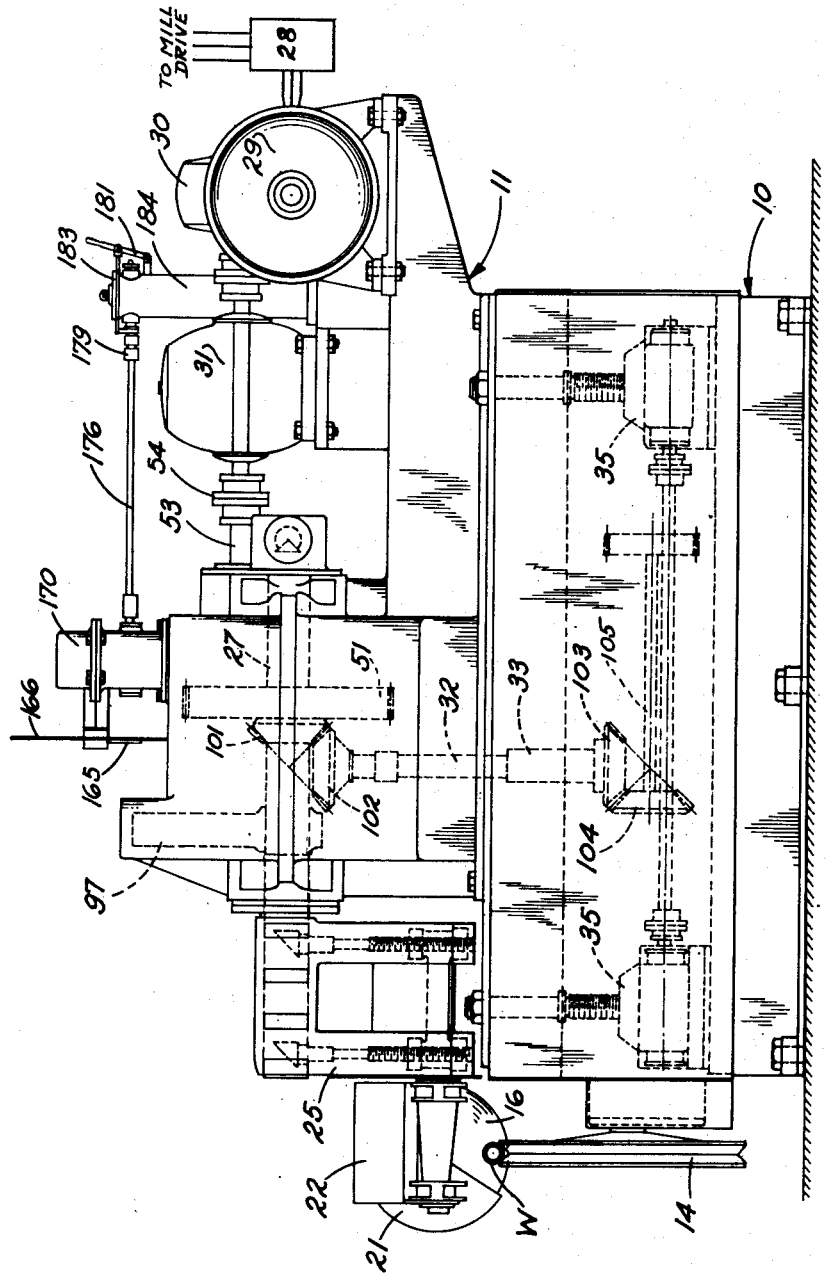

July 14, 1953  W. RODDER  2,645,001
FLYING HOT SAW
Filed Jan. 6, 1949  12 Sheets-Sheet 1

INVENTOR.
WILLIAM RODDER
BY Bosworth & Sessions
ATTORNEYS

July 14, 1953 W. RODDER 2,645,001
FLYING HOT SAW
Filed Jan. 6, 1949 12 Sheets-Sheet 2

INVENTOR.
WILLIAM RODDER
BY Bosworth + Sessions
ATTORNEYS

July 14, 1953  W. RODDER  2,645,001
FLYING HOT SAW
Filed Jan. 6, 1949  12 Sheets-Sheet 3
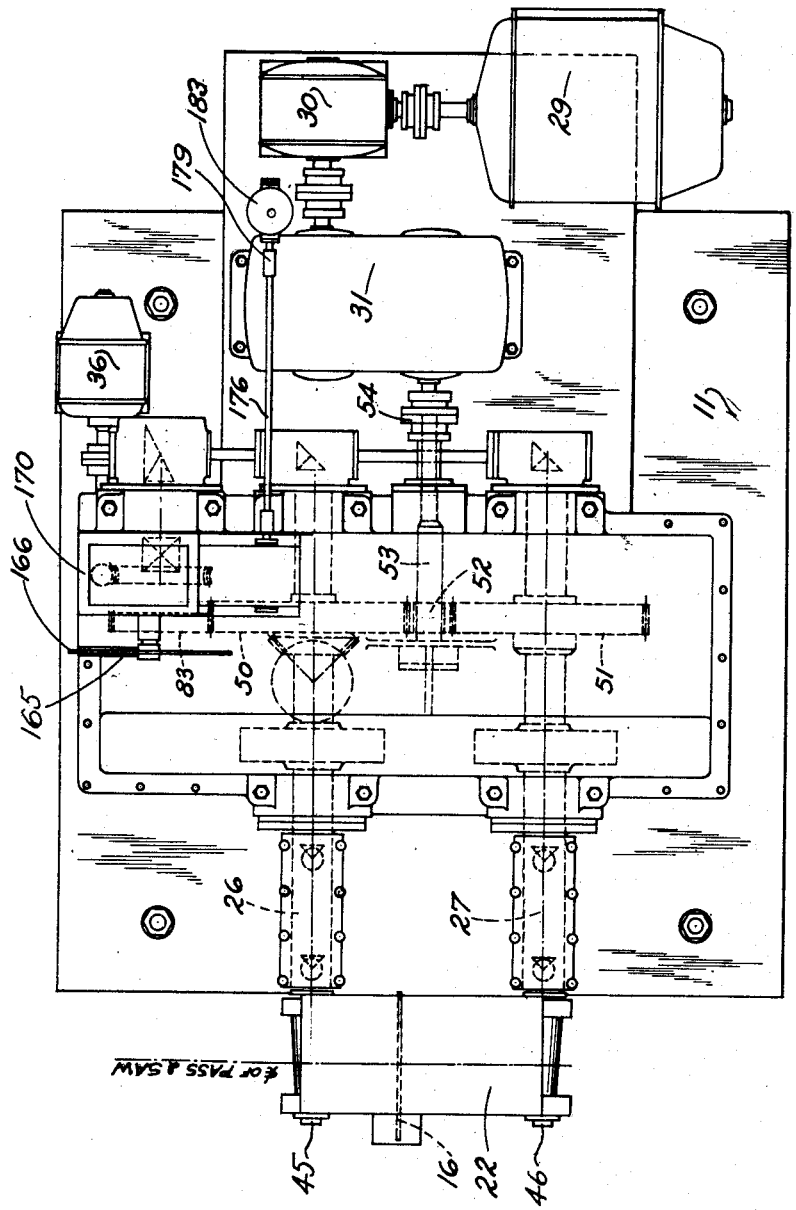
INVENTOR.
WILLIAM RODDER
BY
Bosworth & Sessions
ATTORNEYS July 14, 1953  W. RODDER  2,645,001
FLYING HOT SAW
Filed Jan. 6, 1949  12 Sheets-Sheet 4
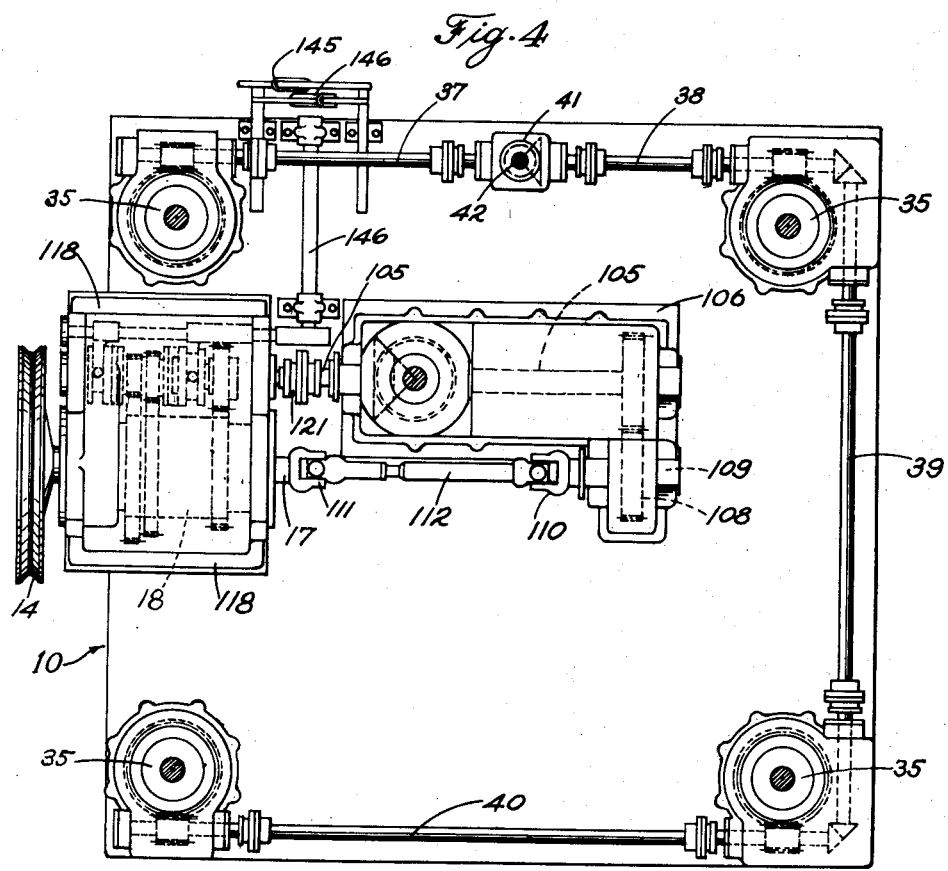
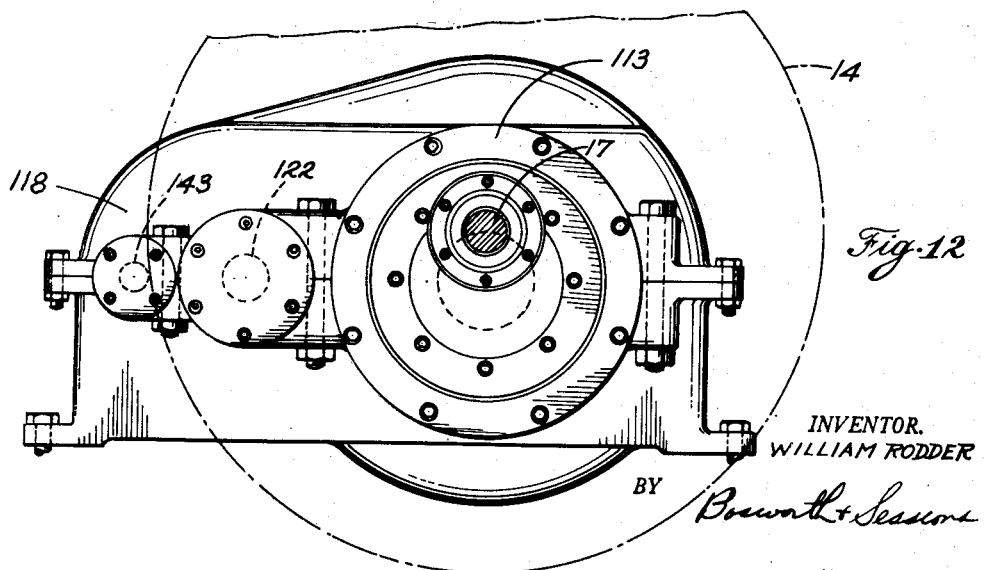
INVENTOR.
WILLIAM RODDER
BY
Bosworth + Sessions
ATTORNEYS July 14, 1953 W. RODDER 2,645,001
FLYING HOT SAW
Filed Jan. 6, 1949 12 Sheets-Sheet 7

INVENTOR.
WILLIAM RODDER
BY
Bosworth + Sessions
ATTORNEYS

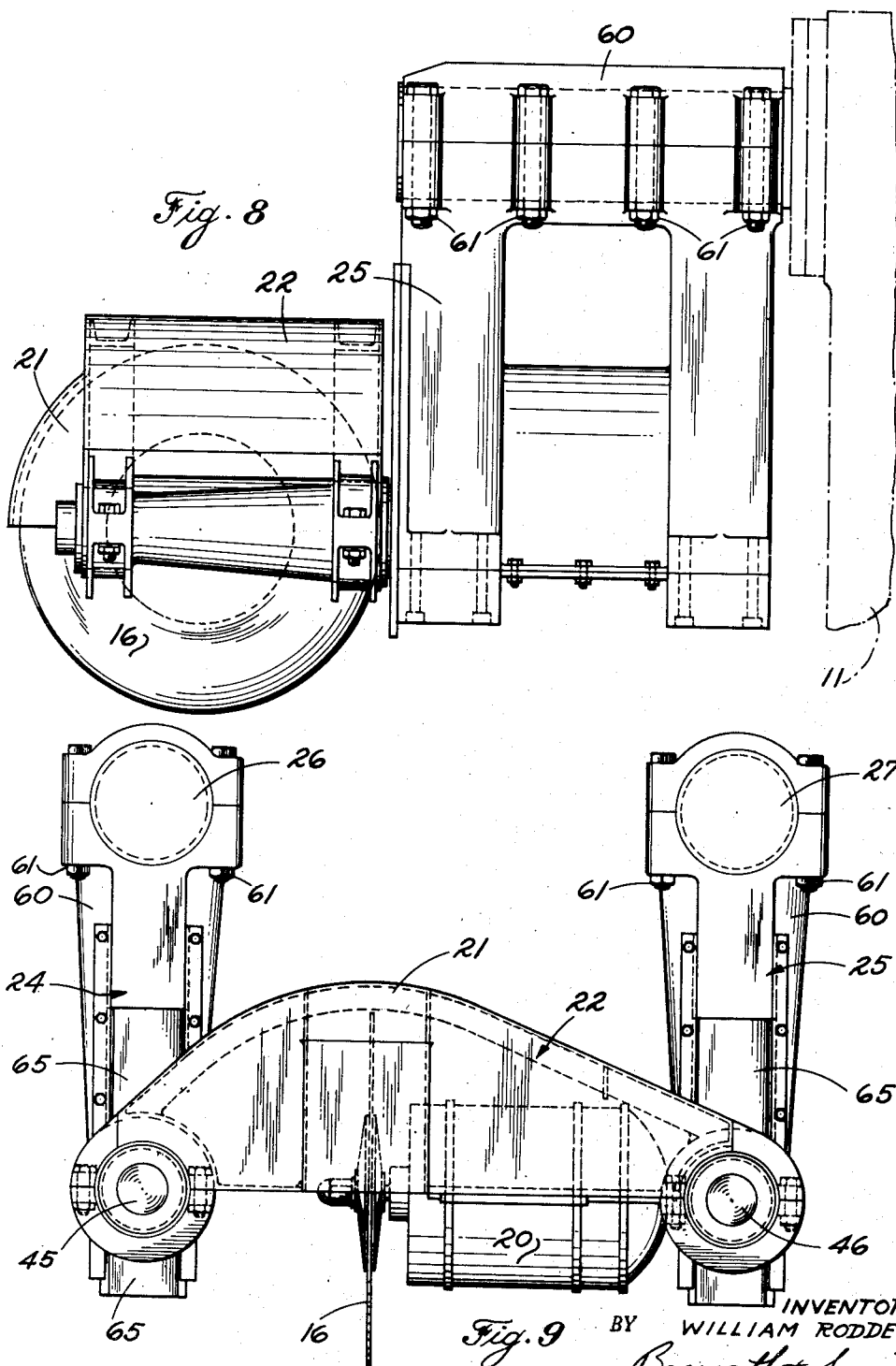

July 14, 1953  W. RODDER  2,645,001
FLYING HOT SAW
Filed Jan. 6, 1949  12 Sheets-Sheet 9

INVENTOR.
WILLIAM RODDER
BY
Bosworth & Sessions
ATTORNEYS

July 14, 1953  W. RODDER  2,645,001
FLYING HOT SAW
Filed Jan. 6, 1949  12 Sheets-Sheet 10

INVENTOR.
WILLIAM RODDER
BY
Bosworth & Sessions
ATTORNEYS

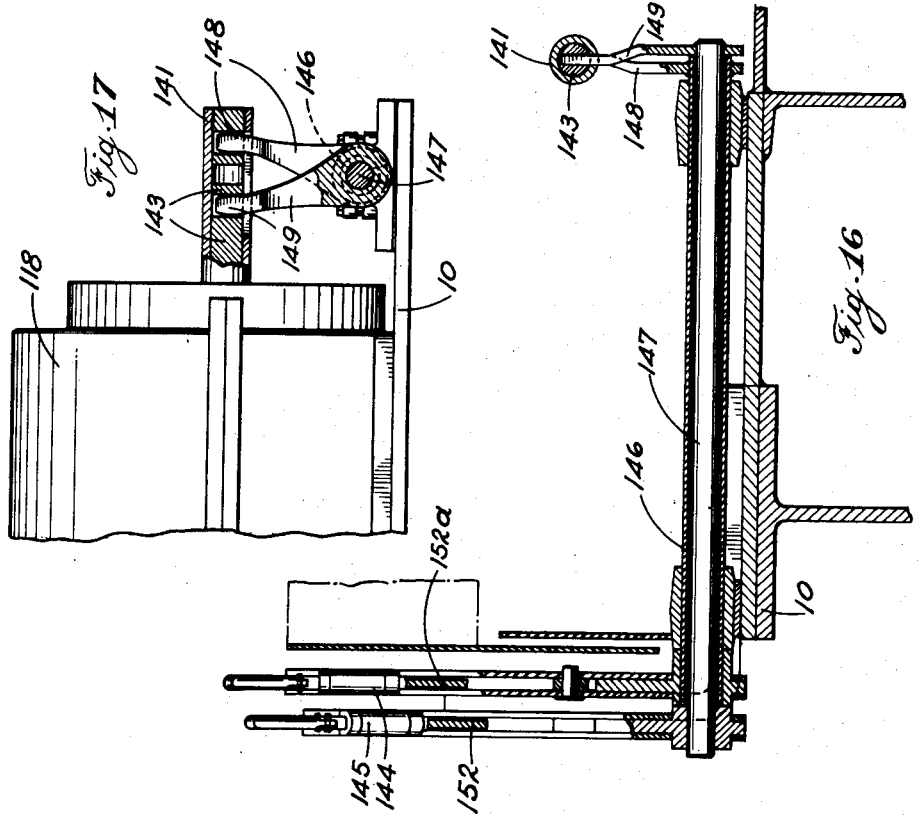
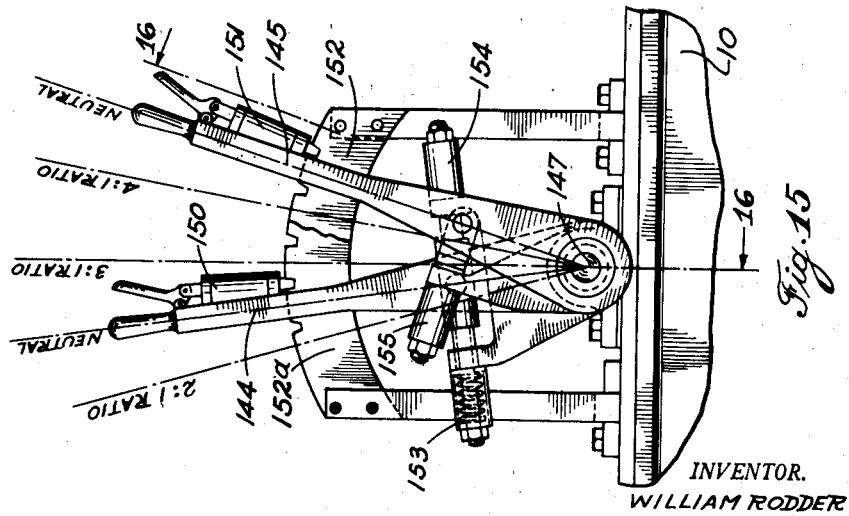

July 14, 1953  W. RODDER  2,645,001
FLYING HOT SAW
Filed Jan. 6, 1949  12 Sheets—Sheet 12
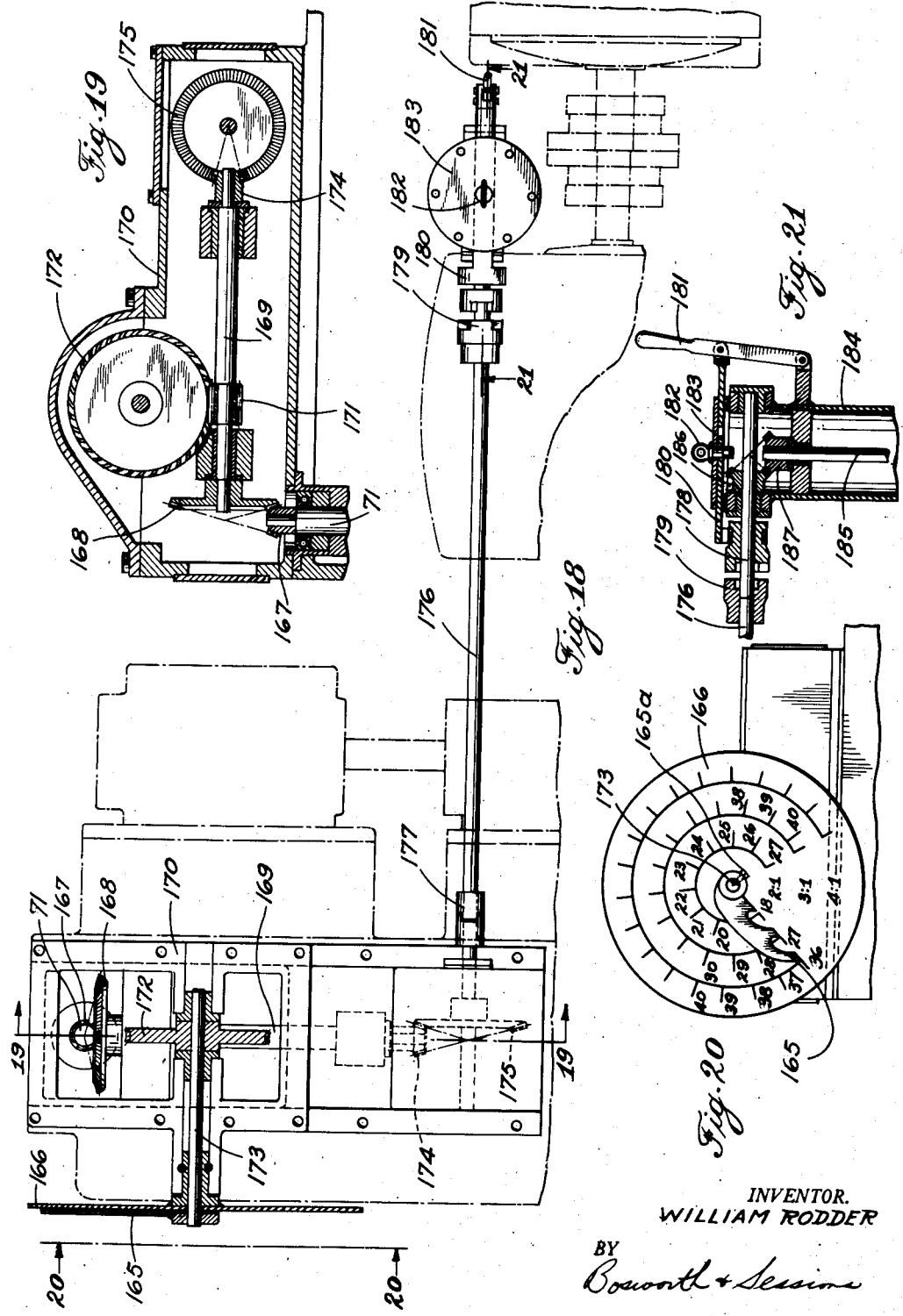
INVENTOR.
WILLIAM RODDER
BY
Bosworth & Sessions
ATTORNEYS Patented July 14, 1953

2,645,001

UNITED STATES PATENT OFFICE 2,645,001

FLYING HOT SAW

William Rodder, Youngstown, Ohio, assignor to The Aetna-Standard Engineering Company, Youngstown, Ohio, a corporation of Ohio Application January 6, 1949, Serial No. 69,521

26 Claims. (Cl. 29—69)

This invention relates to apparatus for cutting off successive lengths from continuously moving stock, and more particularly to flying hot saws for severing rapidly moving tubing, pipe, rod or the like into accurately cut lengths as the material emerges from a mill. The apparatus described herein is designed particularly for sawing welded pipe into lengths but it is to be understood that the invention has other uses and applications.

In the manufacture of steel pipe by the well-known Fretz-Moon process, skelp is heated to welding temperature in a furnace and then passed at high speed through forming and welding rolls. The skelp is supplied in large coils and the forward end of one coil is welded to the trailing end of the preceding coil before the skelp enters the furnace, thus making it possible to carry on the welding operation without interruption for relatively long periods of time. Mills of this type operate at high rates of speed. It is therefore necessary to provide some sort of flying cut-off mechanism in order to cut the pipe into lengths as it emerges from the mill at speeds of, for example, as high as one thousand feet per minute.

Cut-off devices of this sort should be capable of uninterrupted operation for relatively long periods of time for the reason that failure of the cut-off device necessitates shutting down the mill. The devices should be capable of operation on pipe or the like of various sizes, should be adjustable to cut the pipe accurately into various lengths, should be capable of operation at different mill speeds and should cut the pipe without substantial damage to the ends of the pipe. A general object of the present invention is to provide a flying saw or cut-off of an improved type and capable of attaining the above desiderata.

Further objects of the invention include the provision of a flying cut-off apparatus in which the cutting tool is moved continuously in a circular path or orbit, thus avoiding the necessity of starting and stopping heavy machine parts as is required where reciprocating cutting tools are employed. Another object is the provision of a flying saw or cut-off in which the length of the cut can be varied while the apparatus is running. Another object is the provision of such a machine in which the speed of the cutting tool during the cutting operation closely approximates the speed of the work being cut. Another object is the provision of a machine in which the lineal speed of the cutting tool in its orbit can be varied while the apparatus is running. Another object is the provision of such an apparatus embodying simple power operated controls so that the operator can make required adjustments rapidly and easily.

Briefly, I accomplish the foregoing and other objects of the invention by providing a rotary support for my saw or other cutting tool, the support being in the form of a crank mechanism adapted to carry the saw or the like in a circular path. Means are provided for guiding the work in a path disposed in a plane parallel to the plane of the circular path of rotation of the cutting tool, the direction of action of the cutting tool being perpendicular to the path of the work. The crank mechanism carrying the cutting tool is rotated by driving mechanism either mechanically or electrically synchronized with the driving mechanism of the mill so that the rotational movement of the tool in its orbit is in timed relationship with the lineal speed of the work. The work is guided in a path which is normally adjacent to but does not intersect the circular path of the cutting tool; means are provided, however, for periodically deflecting the work from its normal path into the path of the cutting tool thereby to sever the stock. The work is preferably deflected rapidly so that the cutting operation takes place in a very short time, thus minimizing the effect of differences between the lineal speeds of the saw and the work. Adjustments are provided for varying the revolutions per minute of the cutting tool in its circular path or orbit, for varying the radius of the circular path of the cutting tool and thus the lineal speed of the cutting tool, and for varying the number of revolutions made by the cutting tool in its circular path per operation of the means for deflecting the work into the path of the cutting tool. By these means the length of the sections cut from the work can be varied throughout a wide range and the machine can be adjusted to operate accurately and efficiently throughout a wide range of mill speeds.

Figure 2:
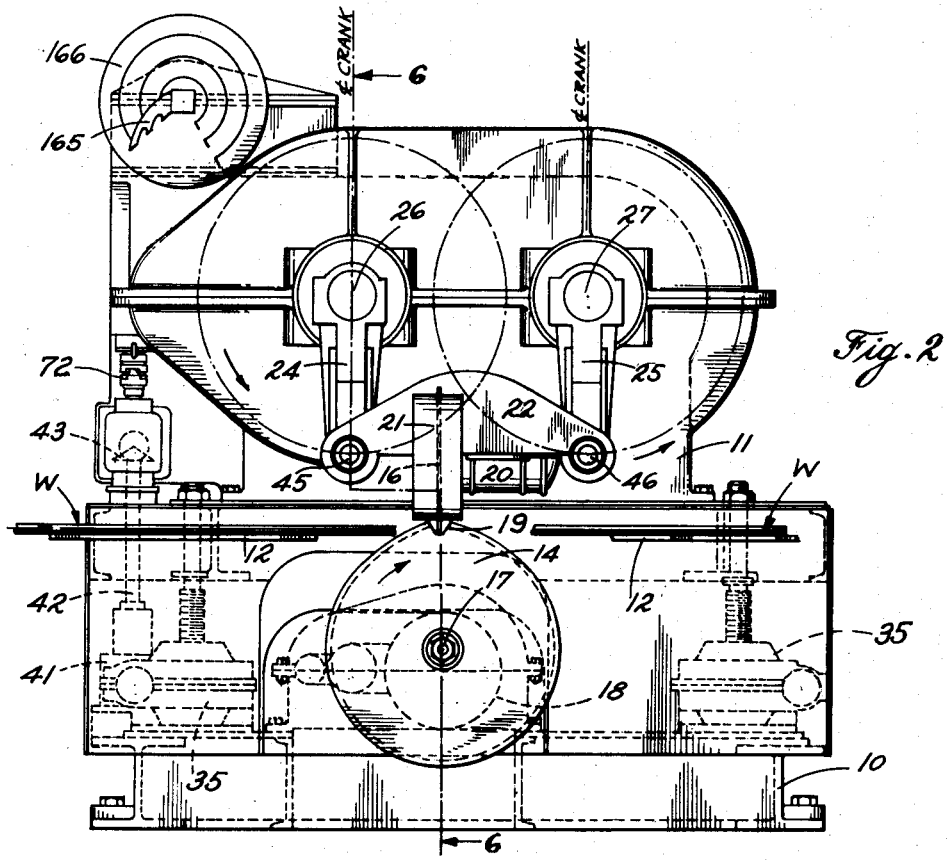
Figure 13:
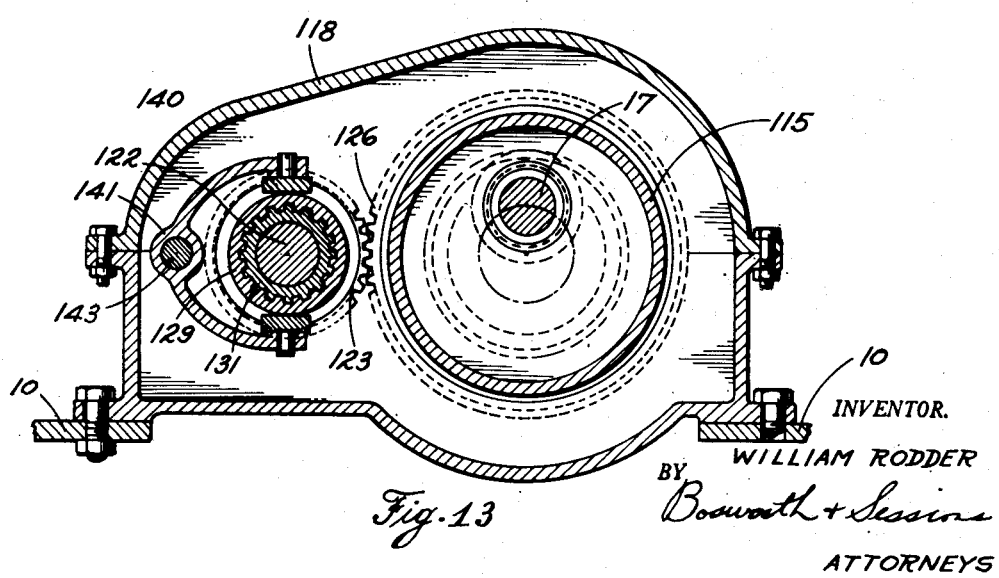
Figure 5:
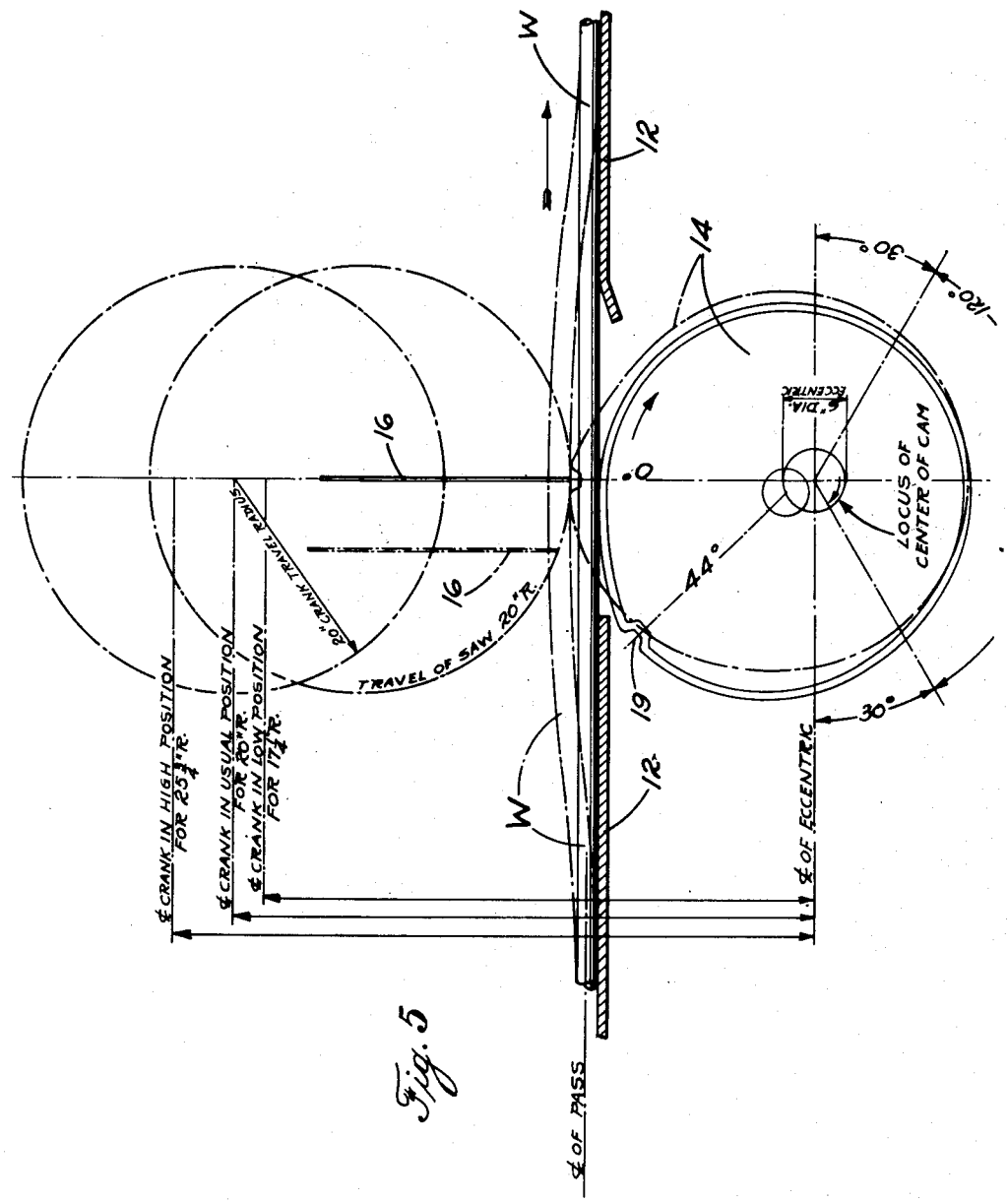
Figure 6:
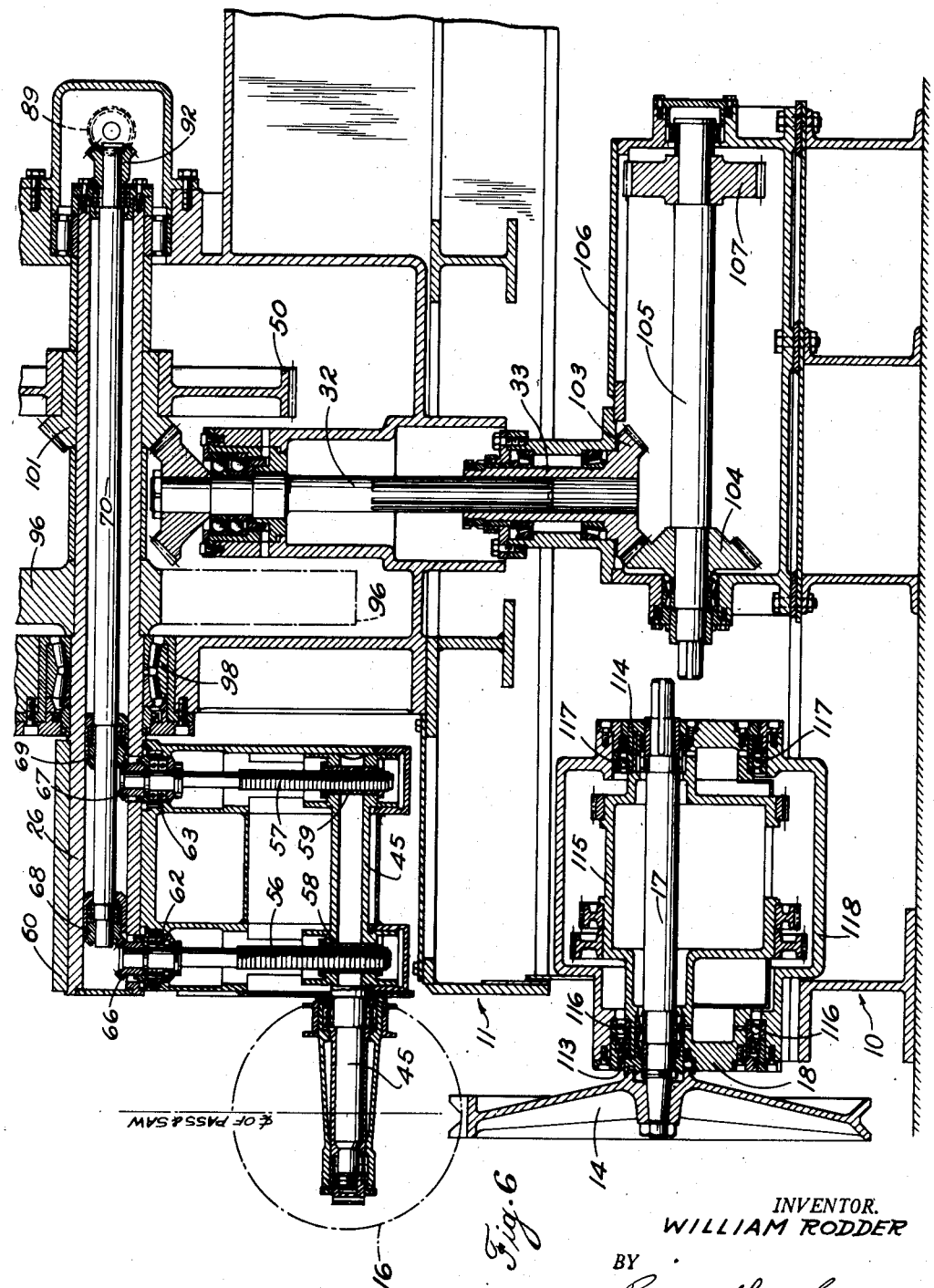
Figure 7:
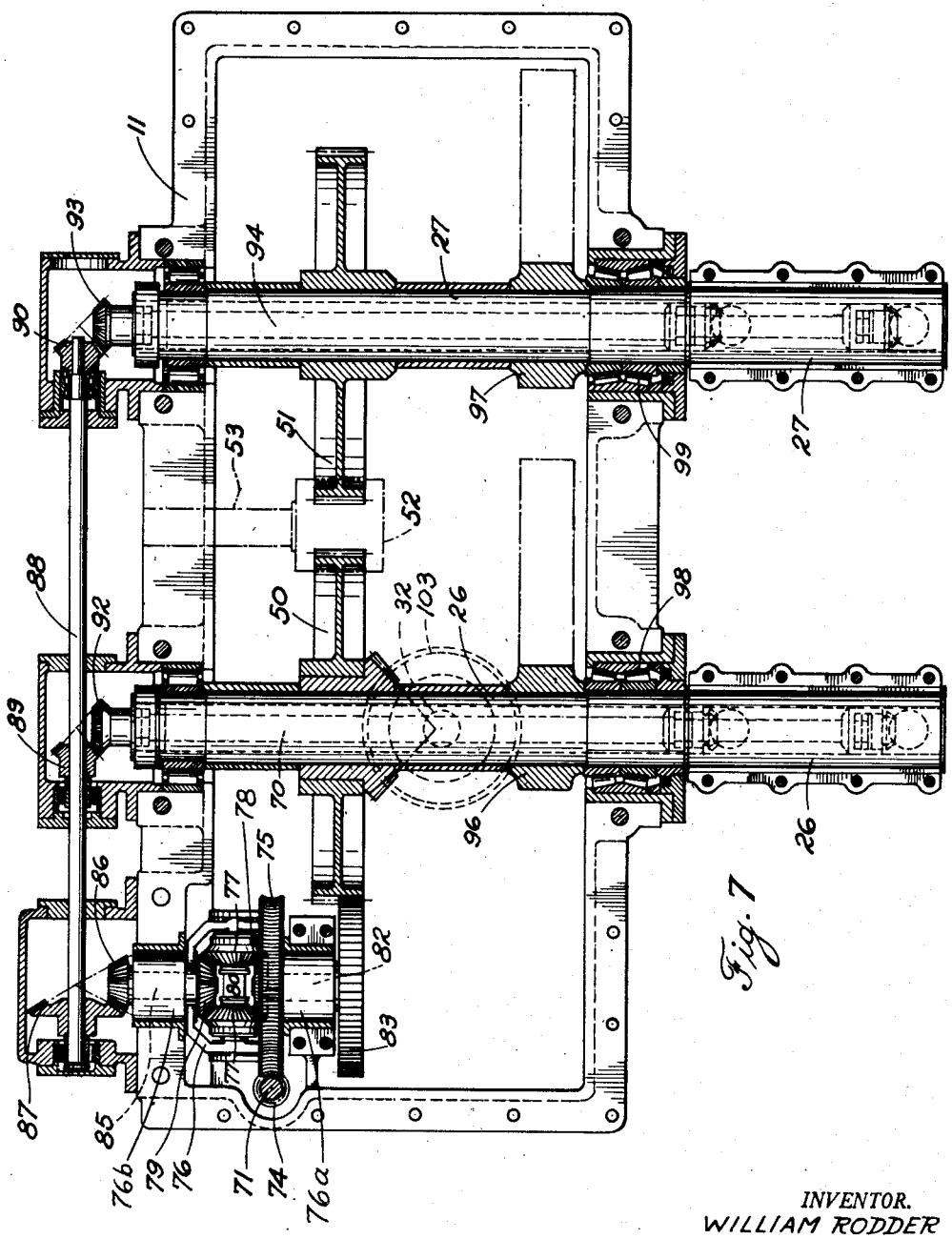
Figure 10:
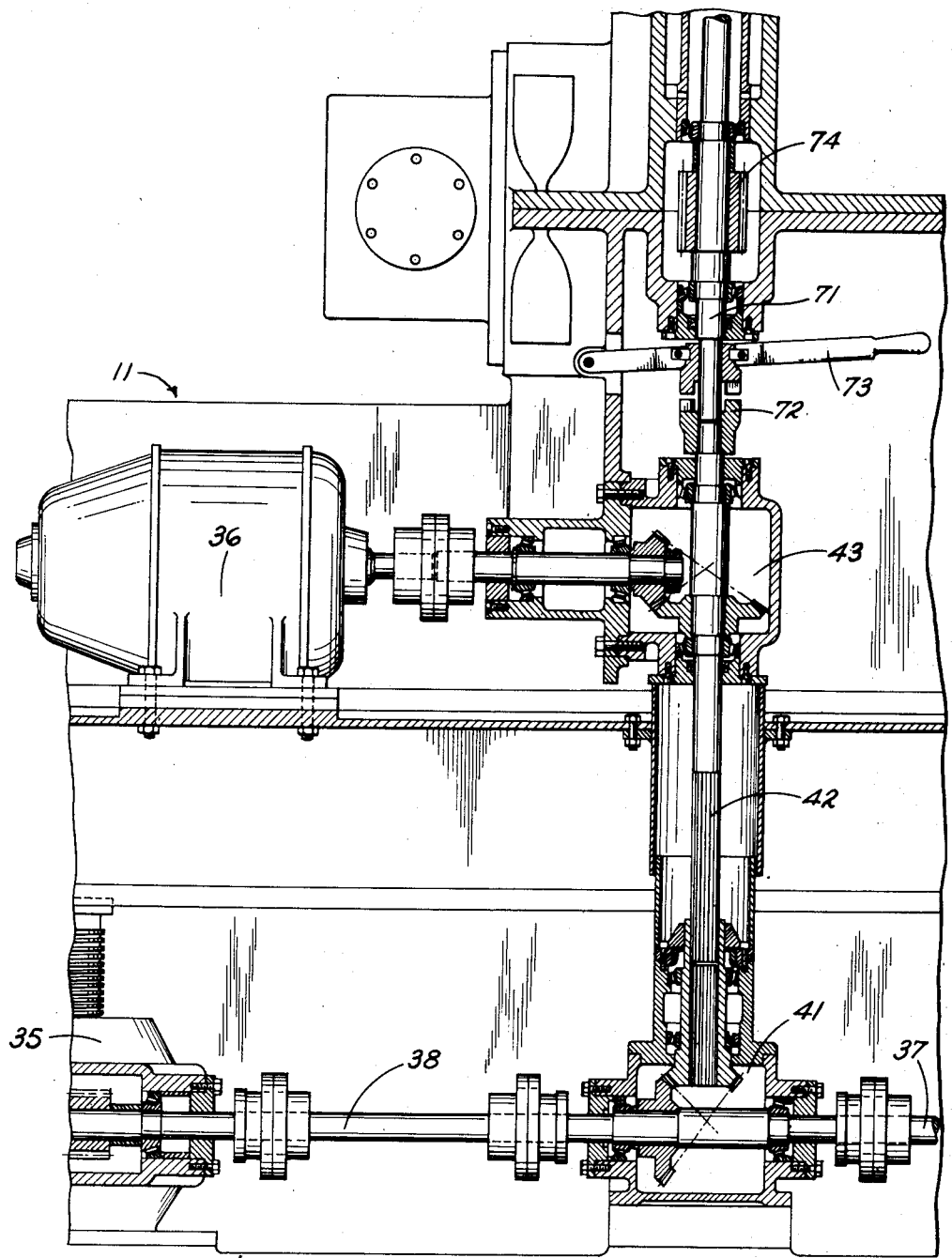
Figure 14:
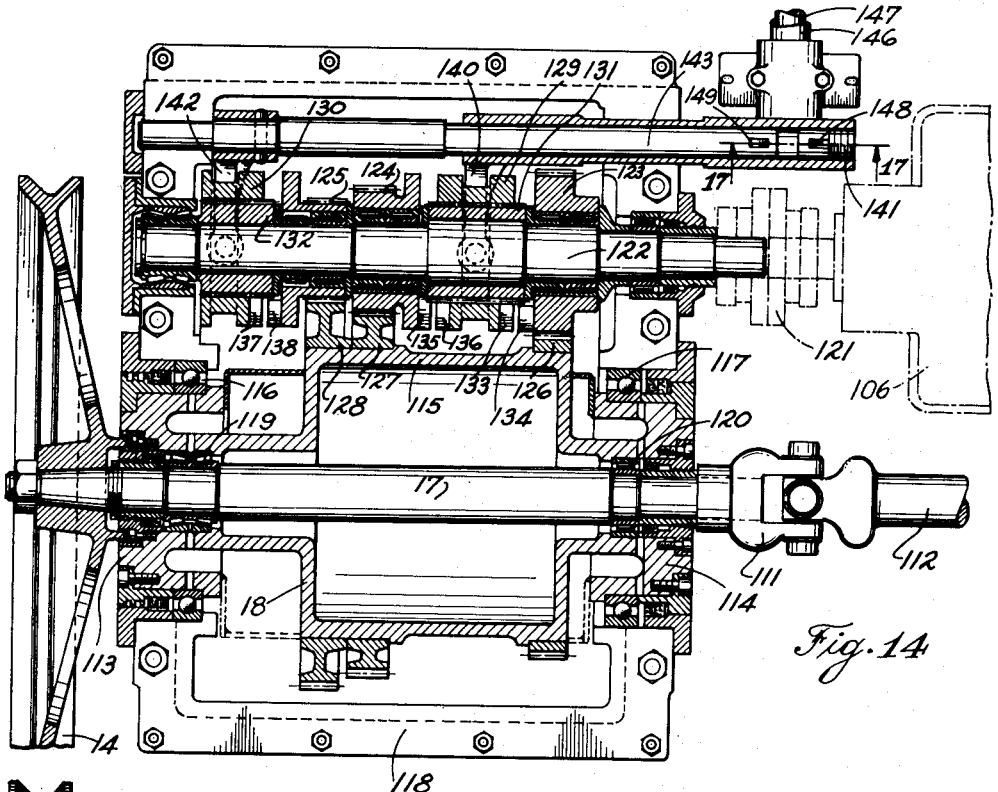
Figure 11:
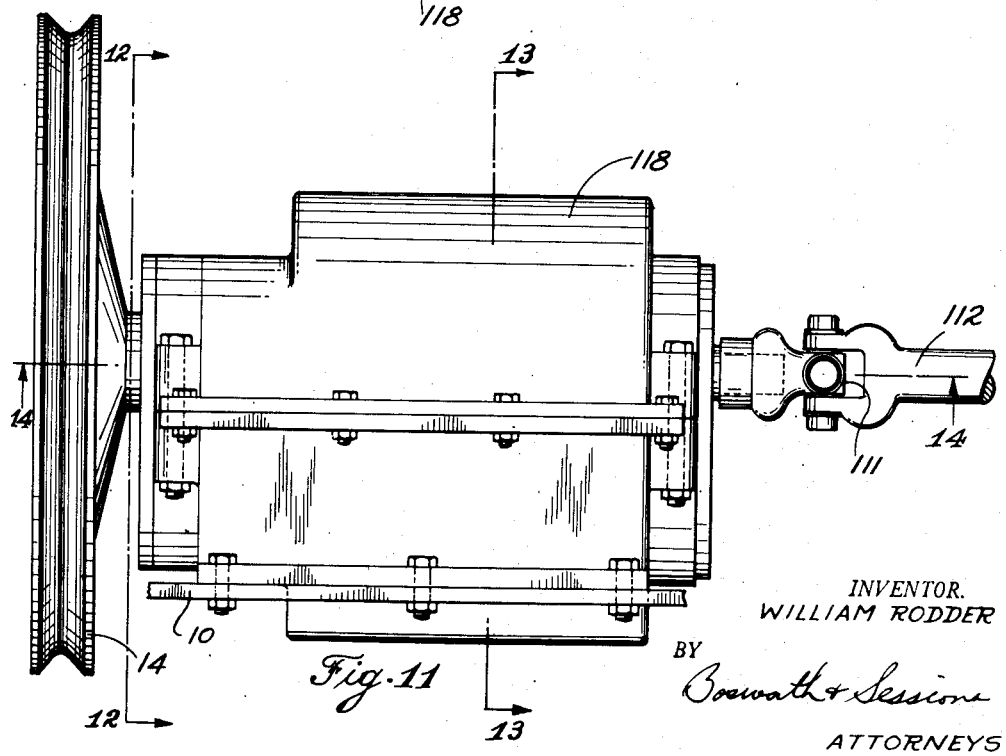

Referring now to the drawings: Figure 1 is a side elevation of a preferred form of flying hot saw embodying my invention; Figure 2 is a front elevation of the machine shown in Figure 1; Figure 3 is a plan view of the machine; Figure 4 is a plan view of the bottom section of the machine which embodies the stock guiding and stock deflecting mechanism, the upper section of the machine being removed for convenience in illustration; Figure 5 is a diagrammatic view illustrating the action of the deflecting cam and the saw, and showing the path of the pipe or other workpiece to be severed; Figure 6 is a vertical sectional view through the entire apparatus, the section being taken substantially as indicated by line 6—6 of Figure 2; Figure 7 is a horizontal sectional view showing the differential gearing mechanism employed for adjusting the length of the crank arms while the apparatus is in operation; Figure 8 is a fragmentary side elevational view on an enlarged scale showing the crank mechanism for carrying the cutting saw in its orbital path; Figure 9 is a front elevation of the mechanism shown in Figure 8; Figure 10 is a vertical sectional detail showing a portion of the drive for the adjusting mechanisms; Figure 11 is an elevational view showing the driving mechanism for the stock deflecting cam; Figures 12 and 13 are transverse sectional views of the driving mechanism for the stock duplicating cam taken along the lines 12—12 and 13—13, respectively, of Figure 11; Figure 14 is a longitudinal sectional view of the drive mechanism of Figure 11 taken along the line 14—14 of Figure 11; Figure 15 is an elevational view illustrating the controls for the change speed gear mechanism in the deflecting cam drive; Figure 16 is a section taken along the line 16—16 of Figure 15; Figure 17 is a detail of the gear shifting mechanism taken as indicated by the line 17—17 of Figure 14; Figure 18 is a detail of the drive for adjusting mechanism; Figure 19 is a section as indicated by line 19—19 of Figure 18; Figure 20 is a view taken as indicated by line 20—20 of Figure 18 and showing a dial for indicating the length of cut taken by the machine; and Figure 21 is a cross-sectional detail of a clutch mechanism incorporated in the adjusting mechanism, the section being taken along the line 21—21 of Figure 18.

*General arrangement.*—As shown particularly in Figures 1, 2, 3 and 4 of the drawings, a preferred form of flying saw embodying the present invention comprises a base section, indicated in general at 10, adapted to be supported on the mill floor, and a top section, indicated in general at 11, adjustably mounted upon the base section. The base section is provided with guides 12 for the workpiece W shown herein as a length of pipe such as produced by a Fretz-Moon mill, and also carries the work deflecting cam 14 and the mechanism for operating it. The top section carries the cutting tool, which in the present embodiment is a circular saw 16, and the crank mechanism for carrying the saw in a circular path. The workpiece travels in the direction of the arrow in Figure 2, and the direction of rotation of the cam 14 and the direction of movement of the saw in its circular path are also indicated by arrows in that figure.

The cam 14 is mounted for rotation on a shaft 17, and the shaft in turn is carried by an eccentric 18 so that by proper timing of the rotation of the eccentric 18 and the shaft 17, the cam can be arranged to deflect the workpiece W into the path of the saw with the notch 19 of the cam arranged to receive the saw, the notch being disposed in the highest part of the pear-shaped cam. The mechanism for driving the cam in proper timed relation with the saw includes change speed gearing to provide for cutting a wide range of lengths; the drive mechanism is carried by the base section 10 of the machine and will be described in detail below.

The saw 16 is driven by an electric motor 20, the saw preferably being mounted directly on the shaft of the motor. The saw blade is partially enclosed by a guard 21. The motor 20 is supported by the frame member 22, and the entire assembly of saw, motor and frame member is carried in a circular path by substantially identical crank members 24 and 25, the two cranks carrying the saw in its circular path with the axes of the motor and saw at all times substantially parallel to the path of the work and the plane of the saw blade substantially perpendicular to the path of the work.

The cranks 24 and 25 are supported on shafts 26 and 27, respectively; the shafts are driven at the desired speed by the main drive motor 29 which is mounted on the upper section 11 of the machine. The main drive motor 29 is driven at a speed proportional to the speed of the mill delivering pipe to the apparatus, suitable conventional electrical controls indicated diagrammatically at 28 being provided for this purpose so that the speed of the motor 29 varies directly with the speed of the mill. Motor 29 drives the crank arms through suitable shafting and gearing, including the speed reducer 30 and the P.I.V. (positive infinitely variable drive) 31, and also drives the cam 14 through the vertical transfer shaft 32 which engages a splined sleeve 33 to enable the upper section 11 to be raised and lowered on the base 10 without interrupting the drive of the cam.

The upper section 11 is supported on the base by four screw jacks 35 disposed substantially at the four corners of the base and of substantially identical construction. These screw jacks may be adjusted by means of the adjusting motor 36 which is mounted on the upper section and which drives the jack adjusting shafts 37, 38, 39 and 40 through the bevel gearing 41, vertical shaft 42 and bevel gearing 43 (see Figures 3 and 10). The adjusting motor also drives the mechanisms for controlling the P.I.V. 31 and for adjusting the lengths of the cranks 24 and 25. By these mechanisms, the length of the crank arms (and hence the lineal speed of the saw), the position of the upper section upon the base section, and the speed of rotation of the crank arms and cam can all be adjusted simultaneously while the apparatus is running. Clutches are provided in the drive from the adjusting motor to enable adjustments to be made individually as well as simultaneously. Thus, the operator, by means of the change speed gearing and the simple controls for the adjusting motor 36, can make such adjustments are may be necessary to control the apparatus accurately to cut the work into sections of the desired length.

The relationships between the saw, the work and the work deflecting cam are illustrated diagrammatically in Figure 5. As indicated, the saw 16 is carried uniformly in a circular path by the cranks 24 and 25. The diagram shows the paths of the center and the cutting edge of the saw with the cranks set for an intermediate radius of, for example, 20 inches, but the radius can be increased or decreased, the top section of the machine and, correspondingly, the center line of the cranks being raised or lowered, respectively, with increasing or decreasing radii, so that the lowermost point in the travel of the saw is at substantially the same level for all radii. The center lines of the cranks for maximum and minimum radii and the locus of the center of the cam in a typical embodiment of the invention are also indicated in the drawing. The normal path of the workpiece is outside of (beneath, in the arrangement shown) the path of the saw so that the saw can travel in its circular path throughout a number of revolutions without cutting the workpiece, the cutting action only taking place when the workpiece is deflected into the path of the saw by the cam 14.

It will be evident that if the workpiece travels at a constant lineal speed, the length of cut made by the saw is determined by the rotational speed of the saw in its circular path and by the action of the deflecting cam. For example, if the work is traveling at 1000 feet per minute and the saw is carried around its circular path at the rate of 100 R. P. M. and the deflecting cam 14 is operated to deflect the work into the path of the saw during every other revolution of the saw, then the workpiece will be cut into 20 foot lengths. If the rotational speed of the saw is reduced and the speed of the cam correspondingly reduced while the speed of the work remains constant, then the length of cut will be increased. Similarly, an increase in the rotational speed of the saw will reduce the length of cut. If the cam is operated to deflect the workpiece into the path of the saw during every third revolution of the saw, then the length of cut for a given speed will be one and one-half times the length cut obtained by operating every other revolution, and further reductions in frequency of cutting will correspondingly increase the length of cut. Thus, by variation of the speed of rotation of the saw and by changing the frequency of operation of the deflecting cam, the length of cut can be varied through a wide range. The lineal speed of the saw is adjusted to correspond closely to the lineal speed of the workpiece by adjusting the radius of the path of travel of the saw by means of cranks 24 and 25, the position of the top section on the base being adjusted to maintain the correct relationship between the workpiece and saw when the saw is in cutting position. The mechanisms for making these several adjustments have been mentioned briefly above and will be described in detail below.

*Saw Driving and adjusting mechanism.*—The mechanisms for mounting, driving and adjusting the saw or other cutting tool are illustrated in Figures 6 to 10, inclusive, in addition to which the general arrangement of the saw is shown in Figures 1, 2 and 3.

The saw is carried in its circular orbital path on the supporting frame member 22 which is carried by suitable bearings on the crank pins 45 and 46 at the ends of crank arms 24 and 25. Thus, the crank pins 45 and 46 rotate within the ends of the frame member 22 as the cranks 24 and 25 carry the frame member 22 with the saw 16 and motor 20 mounted thereon in a circular orbital path. The cranks 24 and 25 are supported on the projecting end portions of hollow shafts 26 and 27, respectively, these shafts being carried by suitable bearings in the upper section 11 of the apparatus.

The shafts 26 and 27 are rotated in synchronism and in the same direction by gears 50 and 51, the gears in turn being driven by a pinion 52 carried by main drive shaft 53 which is driven by the main drive motor 29 through the speed reducer 30, the P.I.V. 31 and the coupling 54 (Figures 1 and 7). By these means the saw is driven in its orbital path at the desired rate of speed, it being possible to adjust the rotational speed of the saw by means of the P.I.V. 31, the relationship between the rotational speed of the main drive motor 29 and the speed of the pipe or other work passing through the saw being maintained by the controls for the motor 29 mentioned above.

As noted above, the length of cut made by the saw is determined by the relationship between the rotational speed of the saw and the lineal speed of the work. In order to obtain correct cutting action, the lineal speed of the saw in a direction parallel to the work should approximate as closely as possible the lineal speed of the work during the actual cutting operation. In order to attain this result, the radius of the cranks 24 and 25 is made adjustable so that the lineal speed of the saw can be given the correct value to produce the proper cutting action at different rotational speeds of the saw and when the apparatus is adjusted to make cuts of different lengths. To this end the adjusting mechanism shown particularly in Figures 6 and 7 is provided. Inasmuch as the cranks 24 and 25 are preferably identical, only crank 24 will be described in detail, this crank being shown in section in Figure 6. As there shown, the crank pin 45 is carried by screws 56 and 57. These screws engage internally threaded sleeves or nuts 58 and 59 which extend diametrically through the tubular crank pin 45 and are secured against rotation with respect thereto. Thus, rotation of the screws 56 and 57 will increase or decrease the effective length of the crank arm and the radius of the path of the crank pin 45 and of the saw.

In order to protect the screws and their associated mechanisms against dirt, the external parts of the crank 24 comprise a housing member 60 (see Figures 6, 8 and 9). The housing 60 is secured to the shaft 26 as by bolts 61 and supports the thrust bearings 62 and 63 in which the inner ends of the screws 56 and 57 are mounted. The front end of the housing 60 is provided with an opening which is closed by a slide 65, the crank pin 45 passing through a closely fitting opening in the slide. Thus, as the screws are operated to change the radius of crank 24, the slide moves inwardly or outwardly with respect to the housing 60 and keeps the housing closed at all times during operation of the machine. The enclosure simplifies the lubrication of the adjusting mechanism and protects the mechanism against the dirt, scale and the like ordinarily present in a pipe mill.

In order to rotate the screws 56 and 57 and thereby to adjust the length of the crank 24, beveled gears 66 and 67 are secured to the inner ends of the screws. These gears mesh with beveled gears 68 and 69 which are mounted on and driven by shaft 70 supported concentrically within hollow shaft 26 by suitable bearings as shown. It will be evident that rotation of the shaft 70 relative to hollow shaft 26 will result in rotation of the screws 56 and 57 about their own axes, whereas, if shafts 70 and 26 rotate together the screws will be held against turning on their own axes. Thus, the screws 56 and 57 will remain fixed so long as shaft 70 rotates at the same speed as hollow shaft 26, but rotation of the screws 56 and 57 about their own axes may be produced by either slowing down or speeding up the rotation of shaft 70 with respect to shaft 26 so that relative rotation takes place between shaft 70 and hollow shaft 26.

Thus by appropriately controlling the speed of rotation of the shaft 70, the screws 56 and 57 can be rotated about their axes during the operation of the crank 24 and the length of the crank can be changed. The mechanism for accomplishing this adjustment by means of the adjusting motor is shown particularly in Figures 6, 7 and 10. The adjusting motor 36 (see Figure 10) drives vertical shaft 42 through the bevel gearing 43. Shaft 42 drives an upwardly extending vertical shaft 71 through jaw clutch 72 which is controlled by handle 73. The shaft 71 carries a worm 74 which engages worm wheel 75 (see Figure 7). The worm wheel 75 is rigidly mounted on the planet carrier 76 of the differential mechanism comprising the planet gears 77, the bevel pinion 78 and the bevel output pinion 79. The planet gears 77 are rotatably mounted on shaft 80 which is supported by the planet carrier 76. Pinion 78 is keyed to shaft 82, and the other end of shaft 82 carries spur gear 83 which meshes with gear 50 which drives hollow shaft 26 and thus rotates the crank 24. Output pinion 79 of the differential is keyed to shaft 85, the other end of shaft 85 carrying bevel pinion 86 which meshes with bevel gear 87. Shafts 82 and 85 are supported within hollow supporting shafts 76a and 76b for the planet carrier, the shafts 76a and 76b being suitably journaled in the upper frame section 11. Gear 87 is keyed to the horizontally extending shaft 88 which also drives bevel pinions 89 and 90. Pinion 89 drives pinion 92 which is keyed to the end of shaft 70 opposite the crank 24 (see Figure 6). Pinion 90 engages a similar bevel gear 93 on the end of shaft 94 disposed within hollow shaft 27 of crank 25, and thus rotation of the shaft 88 controls the mechanisms for adjusting the lengths of both cranks 24 and 25.

The drive mechanism for shaft 88, including the differential mechanism, is such that so long as the shaft 71 and worm 74 are stationary, the shaft 88 is driven at the same rotational speed as the hollow crank shafts 28 and 29, and inasmuch as the pinions 89, 90, 92 and 93 all have the same number of teeth, the shafts 70 and 94 of the crank adjusting mechanisms are driven at the same speed and in the same direction as the crank shafts 28 and 29. This results from the drive for shaft 88 being taken from gear 50 through gear 83, shaft 82 and the differential mechanism. Gear 83, having half as many teeth as gear 50, rotates shaft 82 at twice the speed of hollow shaft 26 and in the opposite direction; so long as planet carrier 76 is held stationary by worm wheel 75 in engagement with worm 74 the only effect of the differential is to reverse the direction of rotation, and the output pinion 79 of the differential rotates at the same speed as but in the opposite direction from pinion 78. Correspondingly, shafts 82 and 85 rotate at the same R. P. M. but in opposite directions, making shaft 85 rotate in the same direction as the hollow crank shaft 26 and 27, and at twice the R. P. M. Shaft 85 drives shaft 88 through the beveled gears 86 and 87. Inasmuch as beveled gear 87 contains twice as many teeth as beveled gear 86, the speed of rotation of shaft 88 is reduced to the speed of crank shafts 26 and 27 and the bevel gears 89, 90, 92 and 93 drive the shafts 70 and 94 in the same direction and at the same speed as the hollow shafts 26 and 27.

Thus, so long as the planet carrier 76 remains stationary, the adjusting shafts 70 and 94 are driven at the same speed and in the same direction as the crank shafts 26 and 27; no relative rotation takes place between shaft 70 and shaft 26 or shaft 94 and shaft 27, the screws 56 and 57 are held against rotation about their own axes and the cranks 24 and 25 are maintained at a constant length.

If, however, it is desired to adjust the length of the cranks, operation of the adjusting motor 36 with the clutch 72 engaged rotates the worm 74 and the worm wheel 75 and planet carrier 76. Depending upon the direction of rotation of the worm wheel 75, this operation either increases or decreases the rate of rotation of pinion 79 and shaft 85 with respect to pinion 78 and shaft 82. For example, if the worm wheel 75 and planet carrier 76 is rotated one full turn with the shaft 82 and gear 78 stationary, the pinion 79 and shaft 85 is rotated two full turns, and the shaft 88 and shafts 70 and 94 are rotated one full turn. The same action takes place with the mechanism in operation. Rotation of the planet carrier thus functions to add or subtract turns from the shafts 85 and 88, and correspondingly from the adjusting shafts 70 and 94, with respect to the hollow crank shafts 26 and 27. The relative rotation so produced drives the adjusting screws 56 and 57 and their counterparts in crank 25 and changes the length of the cranks 24 and 25. The adjustment can be carried out rapidly and easily by operation of the adjusting motor 36 and with equal facility whether the machine is operating or idle.

Inasmuch as the saw driving motor 20, the support 22 and the cranks 24 and 25 are necessarily quite massive, it is desirable to counterbalance these parts. To this end, counterbalances 96 and 97 are secured to the shafts 26 and 27, preferably as close to the bearings 98 and 99 as possible. The counterbalances may be simple steel castings of appropriate size and weight. The broken lines in Figures 6 and 7 illustrate the outlines of suitable counterbalances, the major portion of counterbalance 96 which projects upwardly when crank 24 projects downwardly being broken away in Figure 6 and only the hub portions of the upwardly projecting counterbalances showing in Figure 7.

*Work deflecting cam.*—As noted above, the cam 14 operates periodically to deflect the work into the path of the saw 16, the cam driving means being adjustable so that the work can be deflected into the path of the saw by the cam at the proper time to cut the work into pieces of the desired length. The mechanism whereby the cam is driven in this fashion is illustrated in Figures 1, 2, 4, 6, 8, 11, 12, 13 and 14.

In order to synchronize the rotation of the cam 14 with the rotation of the saw, the cam is driven by the main drive motor 29, the drive being through the hollow crank shaft 26, the beveled gear 101 mounted thereon, the beveled gear 102, vertical shaft 32 which makes a splined connection with sleeve 33. Sleeve 33 carries beveled pinion 103 which drives beveled gear 104 mounted on the short horizontal shaft 105 within the gear case 106 (see Figures 1 and 6). A spur gear 107 is mounted on shaft 105 and meshes with gear 108 (see Figure 4) on stub shaft 109, and shaft 109 drives cam shaft 17 through universal joints 110 and 111 and telescoping shaft 112. This arrangement is employed because the shaft 17 is mounted in eccentric 18; the drive is taken from the end of gear box 106 away from shaft 17 in order to provide sufficient distance between the ends of shafts 17 and 109 to avoid excessive angularity and to provide for proper operation of the universal joints 110 and 111. Cam 14 is keyed to shaft 17 and is driven by the gearing just described in the direction of the arrow in Figure 2 and at the same rotational speed as the saw in its orbital path. The cam is positioned on shaft 17 so that the notch 19 is positioned to receive the blade of the saw 16, the notch being in its highest position at the time the saw is in its lowest position.

In order to raise the cam 14 into a position where it can deflect the work into the path of the saw, the shaft 17 is, as previously noted, supported by eccentric 18. As shown particularly in Figures 6 and 14, the eccentric 18 comprises end bearing portions 113 and 114 and an intermediate enlarged portion 115. The end portions 113 and 114 are supported by suitable bearings 116 and 117 in the gear box 118, which in turn is carried by the base section 10 of the apparatus. The end portions 113 and 114 also carry bearings 119 and 120 which support the shaft 17. The bearings 119 and 120 are eccentric with respect to the bearings 116 and 117. Thus, rotation of the eccentric 18 in the gear box 118 causes the shaft 17 to travel in a circular path and raises and lowers the cam 14. The driving mechanism is timed so that when the shaft 17 is at its highest position, the cam notch 19 is in its highest position and work disposed in the peripheral groove of the cam 14 will be severed by the saw, the paths of the saw, cam and work being illustrated diagrammatically in Figure 5.

In order to drive the eccentric in proper timed relationship with the cam and the saw, the shaft 105 is directly connected by coupling 121 to the input shaft 122 of a three-speed transmission contained within the gear box 118 (see Figures 4 and 14). Inasmuch as shaft 105 is driven from the main drive motor which also drives the cam shaft 17 and the saw in its orbital path, all of these elements are driven in synchronism. The eccentric 18 is driven from the shaft 122 through change speed gearing which includes gears 123, 124 and 125 on the shaft 122 which mesh, respectively, with gears 126, 127 and 128 fixed to the enlarged portion 115 of the eccentric 18. The gears 123, 124 and 125 are supported for rotation with respect to shaft 122 by appropriate anti-friction bearings as shown, but may be keyed in driving relationship to the shaft by means of sliding jaw clutch members 129 and 130 which slide on splined sleeves 131 and 132, respectively, the sleeves being keyed to the shaft 122.

In Figure 14 of the drawings, the transmission is shown in neutral position with the gears 123, 124 and 125 all free to rotate with respect to shaft 122. When the clutch member 129 is slid to the right, the clutch elements 133 and 134 engage so that gear 123 is locked to shaft 122, and in the embodiment shown, the shaft 122 makes two revolutions for one revolution of the eccentric 18, gear 126 having twice as many teeth as gear 123. Inasmuch as the cam driving shaft 17 is driven at the same speed as shaft 105, which is coupled directly to shaft 122, the cam 14 and the saw 16 also make two revolutions for every revolution of the eccentric. The clutch elements 133 and 134 are so positioned that when they are in driving engagement, the eccentric 18 is at its highest point when the notch 19 of cam 14 is also at its highest point and the saw at its lowest point.

When the clutch member 129 is moved to the left, the clutch elements 135 and 136 are engaged, locking the gear 124 to the shaft 122. The ratio between the teeth on gears 124 and 127 is one to three. Hence with clutch member 129 moved to the left, the shaft 122 and the cam driving shaft 17 and cam 14 will each make three revolutions for each revolution of the eccentric 18. When clutch member 129 is placed in neutral position and clutch member 130 is moved to the right to engage clutch elements 137 and 138, gear 125 is locked to shaft 122. Gear 128 has four times as many teeth as gear 125, and accordingly in this position, the driving ratio is four to one, and shaft 17 and cam 14 will make four revolutions for each revolution of eccentric 18. In each instance, the clutch elements are arranged so that they can engage only in positions such that eccentric 18 and the notch 19 of the cam 14 reach their highest points simultaneously, and as previously noted, the saw is timed to be at its lowest point when the notch 19 is at its highest point.

Clutch member 129 is operated by a shifter fork 140 carried by tubular shaft 141, and clutch member 130 is operated by shifter fork 142 carried by shaft 143 disposed within shaft 141. Shafts 141 and 143 are arranged to be operated by levers 144 and 145, respectively, through rock shafts 146 and 147 and levers 148 and 149 which are operatively connected to the shafts 141 and 143, respectively (see Figures 15, 16 and 17). Shaft 146 is supported in suitable bearings carried by the base frame 10, and shaft 147 operates within shaft 146 (see Figure 16). The hand levers 144 and 145 are locked in position by latches 150 and 151 which engage notches in sectors 152 and 152a, appropriate interlocks being provided so that only one of gears 123, 124 or 125 can be locked to the shaft 122 at any time. The hand levers 144 and 145 are connected to their respective rock shafts through spring members 153, 154 and 155 which move the shafts and shifter forks when the clutch members are in proper position for engagement and prevent the application of unduly large forces to the parts if the teeth of the jaw clutches should not be in position for engagement when the hand levers are moved.

It is to be noted that while the present embodiment of the invention shows an arrangement embodying three speed ratios for the eccentric drive, additional speed ratios can be provided if desired. Thus, the eccentric may be driven at the same speed as the cam or at greater reductions than four to one, depending upon the design of the apparatus and the length of pipe to be cut.

*Adjusting mechanism.*—As described above, the number of revolutions of the saw per revolution of the work deflected cam 14 may be varied by the gear shift mechanism just described. Changing the gear ratio requires that the apparatus be stopped. All other adjustments, however, may be made with the apparatus running. These adjustments are the control of the speed of rotation of the saw in its orbit which is effected by the P.I.V. 31, the control of the radius of the crank arms 24 and 25 through the differential mechanism, and the adjustment of the distance between the top and bottom sections, and therefore the distance between the saw and the normal path of the work through the screw jacks 35. These adjustments are made by the adjusting motor 36 which may be controlled by the operator by conventional push button controls. The driving connections between the adjusting motor and the various mechanisms to be adjusted are shown particularly in Figures 1, 2, 3, 4, 10, 18, 19, 20 and 21.

As previously described, the adjusting motor drives the downwardly extending vertical shaft 42 through the beveled gearing 43, the shaft 42 driving the screw jacks 35 through the bevel gearing 41 and shafts 37, 38, 39 and 40. At its upper end the shaft 42 drives the upwardly extending shaft 71 through the jaw clutch 72. Worm 74, which, as previously described, drives the differential mechanism for controlling the radius of the crank arms 24 and 25, is keyed to shaft 71.

Shaft 71 extends upwardly beyond worm 74 and through the mechanism shown particularly in Figures 18, 19, 20 and 21 drives the adjusting mechanism for the P.I.V. 31 and also drives the indicator hand 165 which, with the dial 166, shows the length of cut that the machine is adjusted to make. The drive for the indicator hand is through beveled pinion 167, mounted on the upper end of shaft 71 which drives bevel gear 168; gear 168 is secured to the horizontally extending transverse shaft 169 which is carried by suitable bearings in the gear housing 170; shaft 169 drives worm 171 which engages the indicator hand driving worm wheel 172 mounted upon the short shaft 173, the outer end of which carries the indicator hand 165. The hand is secured in place by setscrew 165a, and hence can be adjusted or reset if necessary.

In order to drive the adjustment for the P.I.V. a bevel pinion 174 is mounted on the end of shaft 169 opposite bevel gear 168. Pinion 174 drives bevel gear 175 which drives horizontal shaft 176 through coupling 177. As shown particularly in Figure 21, shaft 176 drives the stub shaft 178 through jaw clutch 179, the clutch being controlled by link 180 operated by handle 181 and locked in engaged or disengaged position as desired by pin 182 extending through an opening in the cover plate 183 of the vertically extending housing 184 for the adjusting mechanism of the P.I.V. (see Figures 1, 18 and 21). The shaft 178 drives the P I.V. adjusting shaft 185 through the bevel gears 186 and 187.

From the foregoing, it will be evident that the adjusting motor controls the speed of rotation of the cranks and hence of the saw in its orbital path, the position of the upper section 11 upon the base 10 and the radius of the crank arms. At the same time, the indicator 165 is moved to indicate the approximate length of cut for which the machine is set. Inasmuch as the crank arms are driven by the main drive motor 29 and the main drive motor is driven at a speed proportional to the speed of the mill supplying pipe to the saw, the length of cut is not affected by variations in speed of the main drive motor. However, by changing the ratio of the P.I.V. through operation of the adjusting motor 36, the length of the cut can be varied, an increase in the speed of the rotation of the crank arms and motor resulting in a decrease in the length of the pieces cut by the apparatus and vice versa.

In order to maintain the speed of the saw at the time that the cutting action takes place as close as possible to the lineal speed of the work, it is necessary to increase the radius of the crank arms when the length of the pieces cut is increased by decreasing the rotational speed of the saw in its orbit, the radius of the crank arms being increased sufficiently to maintain the lineal speed of the saw in its orbit substantially constant even though the rotational speed is decreased. The reverse action takes place when the rotational speed of the saw is increased. These adjustments and the adjustment of the upper section on the base are effected simultaneously by the operation of the adjusting motor 36. However, the position of the upper section on the base can be adjusted without making any other changes by disengaging the jaw clutch 72 so that the adjusting motor drives only the screw jacks 35 and does not change the adjustment of the P.I.V. or the length of the crank arms. This separate adjustment is necessary in adjusting the machine to cut different sizes of pipe or to compensate for different diameters of saw blades. Also, adjustments of the radius of the crank arm can be carried out without adjusting the speed control of the P.I.V by disengaging jaw clutch 179. The operator uses this adjustment to make the lineal speed of the saw correspond as accurately as possible to the speed of the work passing through the mill. Whenever the radius of the crank arms is adjusted, the position of the upper section 11 with respect to the base 10 is correspondingly adjusted so as to maintain the saw blade in proper position with respect to the path of the work.

*Summary of operation.*—By means of the various adjusting mechanisms just described and the change speed gearing for driving the eccentric, the operator can adjust the apparatus to cut the pipe or other workpiece into accurate lengths within a comparatively wide range. The length of the pieces cut is determined by the number of cuts made by the saw in a given length of pipe. This in turn is determined by the number of revolutions of the saw and of the eccentric which carries the work deflecting cam during the passage of a given length of pipe through the machine. As pointed out above, the main drive motor 29 is controlled by appropriate electrical or mechanical means so that it operates at a speed accurately proportional to the speed of travel of the mill. Therefore, the main drive motor 29 makes a certain definite number of revolutions per unit of length of pipe passing through the cut-off apparatus, and this ratio remains constant regardless of changes in speed of the mill. It follows then that by employing appropriate gearing and by proper adjustment of the P. I. V., the saw can be made to carry out the number of cutting operations for a given length of pipe required to cut the pipe into sections of desired length.

Assume, for example, that it is desired to cut pipe passing through the apparatus into twenty foot lengths. This requires fifty cuts for each one thousand feet of pipe passing through the apparatus. If the ratio of the change speed gearing in gear box 118 is two to one, the pipe will be deflected into the path of the saw every other revolution of the saw. Therefore, the P.I.V. 31 should be adjusted so that for every one thousand feet of pipe passing through the apparatus, the saw 16 and cam 14 will rotate one hundred times, and the eccentric will rotate fifty times to lift the cam to enable the cam to deflect the pipe into position where it is severed by the saw. This ratio of one hundred revolutions of the saw per one thousand feet of pipe travel is constant for the length of cut desired and independent of changes in speed in operation of the mill and cut-off apparatus. Therefore, the operator can adjust the P.I.V. to make cuts of approximately the desired length while the apparatus is stationary and then as the mill is being brought up to speed, the final adjustments for accurate lengths of cut can be made while the machine is running. However, the machine must be stopped if it is necessary to change the ratio of the change speed gearing.

Inasmuch as the saw is carried at a uniform speed in a circular orbit while the pipe moves in a substantially straight line, it will be evident that the saw cannot be adjusted to travel at precisely the same lineal speed as the pipe in a direction parallel to the path of the pipe throughout the cutting operation. However, the average lineal speed of the saw in a direction parallel to the movement of the pipe can be made to approximate very closely the lineal speed of the pipe and, as will be seen by reference to Figure 5, the cutting action of the saw takes place as the saw travels through a comparatively small arc (about 20° in the example shown). Therefore, the differences in speed between saw and work during the cutting operation are small and the saw blade, which may have, for example, a diameter of about 24 inches, deflects sufficiently during the cutting operation to compensate for the slight variations in speed, the cutting action taking place without damaging the cut ends of the pipe and the squareness of the cut being maintained sufficiently for all ordinary commercial purposes. Thus, by carrying out the cutting operation quickly, it is possible to obtain sufficiently close synchronization of the saw and the work, and at the same time move the saw in a circular path at a uniform rotational speed, thereby making possible the use of simple and sturdy mechanisms and obtaining smooth, steady operation.

In order to make the lineal speed of the saw correspond as closely as possible to the speed of the work, the radius of the cranks carrying the saw may be adjusted as described above. This radius in the example given should be such that the saw will travel one thousand feet in its orbital path while rotating one hundred times, i. e., for each revolution the saw should travel ten feet; therefore, the radius of the cranks carrying the saw should be about 19.1 inches.

In operation, the operator adjusts the P.I.V. by means of adjusting motor 36 to produce cuts of the desired length, preliminary adjustment being made by reference to pointer 165 and dial 166 and final corrections being made by actually measuring the length of the pieces being cut. Through the gearing previously described, the adjusting motor simultaneously adjusts the length of the crank arms to produce substantially correct lineal speed of the saw during the cutting operation and also moves the upper section 11 up or down on the base section 10 by means of the screw jacks 35 to give the correct cutting action so that the saw travels entirely through the pipe on the cutting stroke but does not engage the cam 14. After adjustment to the correct length of cut is completed, the operator, by observing the action of the saw and the condition of the cut ends of sections of pipe, can determine whether or not additional adjustment of the crank arms is required to obtain the best cutting action. If, for example, the saw is traveling too slowly, the advancing section of pipe will deflect the portion of the blade of the saw in engagement with the pipe in the direction of pipe travel (to the right in Figures 2 and 5 of the drawings) indicating to the operator that the lineal speed of the saw should be increased by increasing the radius of the crank arms 24 and 25. He can make the required adjustment by disengaging the jaw clutch 179 (Figure 21), thus disconnecting the adjusting motor from the speed control for the P.I.V., and then by operation of the adjusting motor, he can increase the length of the crank arms to the desired amount, simultaneously raising the upper section of the saw to maintain the proper cutting action and to prevent the saw from cutting the cam 14.

Obviously, if the portion of the saw blade in engagement with the pipe is deflected in the opposite direction, the radius of the crank arms should be shortened to reduce the lineal speed of the saw. Deflection of the saw blade cannot be entirely eliminated, but it can be reduced to an amount having negligible effect on the cutting action of the saw.

In the example given, the saw makes one hundred revolutions for each one thousand feet of pipe passing through the apparatus; that is, if the pipe should be traveling at one thousand feet per minute, the saw would be carried around its orbital path at a speed of one hundred R. P. M. Different lengths of cut can be made at this same saw speed by adjustment of the change speed gearing for the eccentric. Thus, if the gear ratio is increased from two to one to three to one, the length of cut will be increased to thirty feet, and if the gear ratio is increased to four to one, the length of cut will be increased to forty feet. These changes can be made only by stopping the apparatus and shifting the gears by means of the levers 144 and 145. Such changes in the gear ratio require no change in the P.I.V. or the length of the crank arms for cutting the pipe of the lengths specified. However, within the range of the apparatus, an infinite number of lengths of pipe can be cut for each speed ratio.

Thus, in an apparatus such as shown in the drawings, the P.I.V. and the crank radius can be adjusted to cut lengths of pipe from 18 to 27 feet at the two to one ratio, from 27 to 40½ feet at the three to one ratio, and from 36 to 54 feet at the four to one ratio. Adjustment of the apparatus within any one of these ranges can be made while the apparatus is running, the adjusting motor being utilized to adjust simultaneously the P.I.V., the length of the crank arms and the position of the upper section on the base, the length of cut being accurately set first by means of the simultaneous adjustment of all three elements and thereafter the radius of the crank arms being adjusted to accurately give the desired lineal speed of the saw.

It will be understood that the gearing between the adjusting motor and the several instrumentalities which it controls is selected so that simultaneous adjustment of the instrumentalities is substantially correct, only a small amount of additional adjustment ordinarily being required. The hand 165 and the dial 166 indicate with a considerable degree of accuracy the length of cut for which the apparatus is set.

It will be noted that the apparatus contains no reciprocating parts. The saw is carried in its circular orbital path at a uniform rotational speed. It is unnecessary to accelerate and decelerate any heavy masses in the operation of the apparatus, and the saw and its driving and supporting mechanisms are counterbalanced so that the machine operates without excessive vibration. Therefore, it is possible to operate the apparatus at high speed for long periods of time and with the production of pipe sections cut accurately to length within, for example, a tolerance of plus or minus one inch in a piece thirty feet long.

Necessary adjustments can be made quickly and accurately and a wide range of lengths can be cut. The operation of the cam in deflecting the pipe into the path of the saw results in the severing of the pipe taking place very rapidly with the saw severing the pipe in a small fraction of a revolution and quickly moving again out of the path of the pipe. The speed of this operation is such that the difference in the distance traveled by the pipe and the distance traveled by the saw in a direction parallel to the pipe during the cutting operation is so small as to be negligible insofar as proper operation of the saw is concerned.

Those skilled in the art will appreciate that various changes and modifications can be made in my invention without departing from the spirit and the scope thereof. The apparatus can be adapted for other purposes and uses. It is intended, therefore, that the patent shall cover, by suitable expression in the appended claims, whatever features of patentable novelty reside in the invention.

I claim:

1. Apparatus for severing successive longitudinal sections from continuously moving elongated work such as pipe, tube, rod and the like, comprising a cutting tool, a rotary support for said cutting tool comprising a crank and means for rotating said crank to cause said tool to travel in a circular path, means for guiding the work in a normal path displaced radially from the center of rotation of said crank and near but not intersecting the path of said tool, means driven in synchronism with said crank for periodically deflecting the work from its said normal path into the path of the tool, means for varying the radius of said crank and means for simultaneously varying the distance between the center of rotation of said crank and said guide means and deflecting means to maintain the relationship between the path of the work and the path of the tool substantially constant regardless of changes in the radius of said crank.

2. Apparatus for severing successive longitudinal sections from continuously moving work such as pipe, tube, rod and the like, comprising a cutting tool, a rotary support for said cutting tool comprising a crank and means for rotating said crank to cause said tool to travel in a circular path, means for guiding the work in a normal path displaced radially from the center of rotation of said crank, means for varying the radius of said crank while said crank is rotating, and means for simultaneously varying the distance between the guiding means for said work and the center of rotation of said crank to maintain the relationship between the path of said work and the path of said tool substantially constant regardless of changes in the radius of said crank.

3. Apparatus for severing successive longitudinal sections from continuously moving work such as pipe, tube, rod and the like comprising a cutting tool, a rotary support for said cutting tool comprising a crank and means for rotating said crank to cause said tool to travel in a circular path, means for guiding the work in a path parallel to the plane of the circular path of the tool and displaced from the center of rotation of said crank, means for varying the radius of said crank, and means for varying the distance between the guiding means for said work and the center of rotation of said crank whereby the relationship between the path of said work and the path of said tool can be maintained substantially constant regardless of changes in the radius of said crank.

4. Apparatus for severing successive longitudinal sections from continuously moving work such as pipe, tube, rod and the like, comprising a cutting tool, a rotary support for said cutting tool comprising a crank and means for rotating said crank to cause said tool to travel in a circular path, means for guiding the work in a path parallel to the plane of the circular path of the tool and displaced radially from the center of rotation of said crank, means synchronized with the drive of the work for driving said crank, said crank driving means embodying a variable speed drive, whereby the ratio between the speed of crank and the speed of the work and, correspondingly, the length of the sections severed from the work can be varied, means for varying the radius of said crank while said crank is rotating, and means for varying the distance between the guiding means for said work and the center of rotation of said crank to maintain the relationship between the path of said work and the path of said tool substantially constant regardless of changes in the radius of said crank.

5. Apparatus for severing successive longitudinal sections from continuously moving work such as pipe, tube, rod and the like, comprising a cutting tool, a rotary support for said cutting tool comprising a crank and means for rotating said crank to cause said tool to travel in a circular path, means for guiding the work in a path parallel to the plane of the circular path of the tool and displaced from the center of rotation of said crank, means synchronized with the drive of the work for driving said crank, said crank driving means embodying a variable speed drive, whereby the ratio between the speed of crank and the speed of the work and, correspondingly, the length of the sections severed from the work can be varied, means for varying the radius of said crank while said crank is rotating, means for varying the distance between the guiding means for said work and the center of rotation of said crank to maintain the relationship between the path of said work and the path of said tool substantially constant regardless of changes in the radius of said crank, and motor operated means for simultaneously adjusting the variable speed drive, the radius of the crank and the distance between the guiding means and the center of rotation of the crank.

6. Apparatus for severing successive longitudinal sections from continuously moving work such as pipe, tube, rod and the like, comprising a cutting tool, a rotary support for said cutting tool comprising a crank and means for rotating said crank to cause said tool to travel in a circular path, means for guiding the work in a path outside of the path of the tool and parallel to the plane of the circular path of the tool and displaced from the center of rotation of said crank, means synchronized with the drive of the work for driving said crank, means driven in synchronism with the crank driving means for periodically deflecting the work into the path of the tool, change speed gearing interposed in the drive for said deflecting means for varying the number of revolutions of said crank per operation of said deflecting means, said crank driving means embodying a variable speed drive, whereby the ratio between the speed of crank and the speed of the work and, correspondingly, the length of the sections severed from the work can be varied, means for varying the radius of said crank while said crank is rotating, means for varying the distance between the guiding means for said work and the center of rotation of said crank to maintain the relationship between the path of said work and the path of said tool substantially constant regardless of changes in the radius of said crank, and motor operated means for simultaneously adjusting the variable speed drive, the radius of the crank and the distance between the guiding means and the center of rotation of the crank.

7. Apparatus for severing successive longitudinal sections from continuously moving work such as pipe, tube, rod and the like, comprising a cutting tool, a rotary support for said cutting tool comprising a crank and means for rotating said crank to cause said tool to travel in a circular path, means for guiding the work in a path outside of the path of the tool and parallel to the plane of the circular path of the tool and displaced from the center of rotation of said crank, means synchronized with the drive of the work for driving said crank, means driven in synchronism with the crank driving means for periodically deflecting the work into the path of the tool, change speed gearing interposed in the drive for said deflecting means for varying the number of revolutions of said crank per operation of said deflecting means, said crank driving means embodying a variable speed drive, whereby the ratio between the speed of crank and the speed of the work and, correspondingly, the length of the sections severed from the work can be varied, means for varying the radius of said crank while said crank is rotating, means for varying the distance between the guiding means for said work and the center of rotation of said crank to maintain the relationship between the path of said work and the path of said tool substantially constant regardless of changes in the radius of said crank, indicator means including a pointer and a dial arranged to indicate the approximate length of cut for which the apparatus is set, and motor operated means for simultaneously adjusting the variable speed drive, the radius of the crank and the distance between the guiding means and the center of rotation of the crank and for driving said indicator means.

8. Apparatus for severing successive longitudinal sections from work such as pipe, tube, rod and the like which is continuously moved by driving mechanism comprising a cutting tool, a rotary support for said cutting tool comprising a crank and means for rotating said crank to cause said tool to travel in a circular path, means for guiding the work into a position to be cut by said tool in a path parallel to the plane of the circular path of the tool and displaced radially from the center of rotation of said crank, means synchronized with the driving mechanism of the work for driving said crank, said crank driving means embodying a variable speed drive, means for adjusting the variable speed drive to vary the ratio of the rotational speed of the crank with respect to the lineal speed of the work thereby to vary the length of the sections severed from the work, means for simultaneously varying the radius of said crank to maintain the relationship between the lineal speed of the tool and the lineal speed of work substantially constant regardless of changes in said ratio, and means for simultaneously adjusting the distance between the guiding means for said work and the center of rotation of said crank to maintain the relationship between the path of said work and the path of said tool substantially constant regardless of changes in the radius of said crank.

9. Apparatus for severing successive longitudinal sections from work such as pipe, tube, rod and the like which is continuously moved by driving mechanism comprising a cutting tool, a rotary support for said cutting tool comprising a crank and means for rotating said crank to cause said tool to travel in a circular path, means for guiding the work into a position to be cut by said tool in a path parallel to the plane of the circular path of the tool, means synchronized with the driving mechanism of the work for driving said crank, said crank driving means embodying a variable speed drive, means for adjusting the variable speed drive to vary the ratio of the rotational speed of the crank with respect to the lineal speed of the work thereby to vary the length of the sections severed from the work, and means for simultaneously varying the radius of said crank to maintain the relationship between the lineal speed of the tool and the lineal speed of work substantially constant regardless of changes in said ratio.

10. Apparatus for severing successive lengths from continuously moving elongated work such as pipe, tube, rod and the like, comprising a base, an upper section, and screw means for supporting the upper section on the base whereby the upper section may be adjusted vertically with respect to the base, said upper section supporting a circular saw, a rotary support for carrying said saw in a circular orbital path, means for varying the radius of said path, a main drive motor for driving said rotary support, the driving connections between said motor and said rotary support including a P.I.V., said base being provided with guides for the work and means for deflecting the work into the path of said saw, driving connections between said main drive motor and said deflecting means for driving said deflecting means in timed relation with the movement of said saw in its orbital path, and an adjusting motor and driving connections therefrom whereby said adjusting motor is adapted simultaneously to adjust the P.I.V., the radius of the path of the saw and position of the upper section on the base.

11. Apparatus according to claim 10 wherein the driving connections from the adjusting motor include a clutch in the connection to the P.I.V., whereby the clutch can be disengaged to permit adjustment of the radius of the path of the saw and the position of the upper section on the base without changing the speed ratio of the P.I.V.

12. Apparatus for severing successive lengths from continuously moving elongated work such as pipe, tube, rod and the like, comprising a base, an upper section and screw means for supporting the upper section on the base whereby the upper section may be adjusted vertically with respect to the base, said upper section supporting a circular saw, a rotary support for carrying said saw in a circular orbital path, means for varying the radius of said path, a main drive motor for driving said rotary support, said base being provided with guides for the work and means for deflecting the work into the path of said saw, driving connections between said main drive motor and said deflecting means for driving said deflecting means in timed relation with the movement of said saw in its orbital path, and an adjusting motor adapted simultaneously to adjust the radius of the path of the saw and position of the upper section on the base.

13. Apparatus for severing successive lengths from continuously moving elongated work such as pipe, tube, rod and the like, comprising a base and an upper section, said upper section supporting a circular saw, a rotary support for carrying said saw in a circular orbital path, means for varying the radius of said path, a main drive motor for driving said rotary support, the driving connections between said motor and said rotary support including a P.I.V., said base being provided with guides for the work and means for deflecting the work into the path of said saw, driving connections between said main drive motor and said deflecting means for driving said deflecting means in timed relation with the movement of said saw in its orbital path, and an adjusting motor adapted simultaneously to adjust the P.I.V. and the radius of the path of the saw to maintain the lineal speed of the saw substantially constant for a given speed of the main drive motor regardless of changes in the radius of said path.

14. In an apparatus of the class described, a cutting tool, crank means for carrying the cutting tool in a circular orbital path and means for driving said crank, said crank means comprising a crank shaft, an extensible crank arm and a crank pin carried by said crank arm, and means under control of the operator and independent of the angular position of the crank arm for adjusting the length of said crank arm while the crank means is operating.

15. In an apparatus of the class described, a cutting tool, crank means for carrying the cutting tool in a circular orbital path, said crank means comprising a hollow crank shaft, a crank arm secured to said shaft, said arm comprising a screw threaded member rotatable about its own axis and extending radially outwardly from said shaft, another member in threaded engagement with said screw threaded member, a crank pin supported by said other member, means extending through said hollow crank shaft for rotating said screw threaded member with respect to said other member to lengthen or shorten said crank arm, means carried by said crank pin for supporting said cutting tool, and means for driving said crank shaft.

16. Apparatus according to claim 15 wherein the means for rotating the screw threaded member comprises an adjusting shaft extending through said hollow crank shaft and connected to said screw threaded member, and wherein means are provided for driving said shaft either at precisely the same speed as said hollow crank shaft whereby said screw threaded member is retained against rotation about its axis or at a greater or lesser speed than said hollow crank shaft whereby said screw threaded member can be rotated in either direction to increase or decrease the length of said crank arm.

17. Apparatus according to claim 16 wherein the drive for said adjusting shaft is taken from the drive for said crank shaft through a differential mechanism embodying an input pinion, an output pinion, a rotatable planet carrier, a planet gear carried thereby and in engagement with both said pinions, and means under control of the operator for securing said planet carrier against rotation and for rotating said planet carrier in either direction.

18. Apparatus according to claim 15 wherein two substantially identical crank means are provided, and wherein the crank pins carry a frame member upon which the cutting tool is mounted.

19. Apparatus according to claim 18 wherein the cutting tool comprises a motor-driven circular saw mounted on said frame with its axis extending parallel to the plane of the crank arms.

20. Apparatus for severing successive longitudinal sections from continuously moving elongated work such as pipe, tube, rod and the like comprising a cutting tool, guides for guiding the work in a normal path, a rotary support for said cutting tool adapted to move said tool in a circular orbital path in a plane parallel to and approaching but not intersecting the normal path of the work, a cam for periodically deflecting the work from its said normal path into the path of the cutting tool, means including a shaft on which the cam is mounted for driving the cam at the same rotational speed as and in the opposite direction from the rotary support for the cutting tool, and means including an eccentric driven continuously and in synchronism with the cam and the rotary support for the cutting tool for periodically moving the cam shaft toward the path of the work to enable the cam to engage the work and deflect it into the path of the saw.

21. Apparatus for severing successive longitudinal sections from continuously moving elongated work such as pipe, tube, rod and the like, comprising a cutting tool, means for guiding the work in a normal path, a rotary support for said cutting tool adapted to move said tool in a circular path approaching but not intersecting the normal path of the work and in a plane parallel to the path of the work, said rotary support comprising two crank arms and a frame member carried by said crank arms for supporting said tool, means for driving said rotary support, and means including a cam adapted to engage the work for periodically deflecting the work from its said normal path into the path of said cutting tool, said cam being mounted upon a shaft rotated in synchronism with said rotary support, said shaft being mounted in an eccentric, there being means for driving said eccentric in timed relation with said rotary support to move said shaft to its position nearest the path of the cutting tool when the highest point of said cam is nearest the path of the cutting tool and said cutting tool is in its position nearest the normal path of the work.

22. Apparatus according to claim 21 in which change speed gearing is interposed in the driving mechanism for the eccentric, whereby the number of revolutions of said cam per revolution of said eccentric can be varied.

23. Apparatus for severing successive longitudinal sections from continuously moving elongated work such as pipe, tube, rod and the like comprising a motor driven circular saw, guides for guiding the work in a normal path, a rotary support for said saw adapted to move said saw in a circular orbital path in a plane parallel to and approaching but not intersecting the normal path of the work, said rotary support comprising a pair of crank arms and a frame member mounted directly on said crank arms and supporting the saw, the crank arms rotating in planes parallel to the path of the work and carrying the saw in said circular path with the axis of the saw always substantially parallel to the normal path of the work, means for periodically deflecting the work from its said normal path into the path of said saw and means for driving said rotary support and said deflecting means in synchronism.

24. Apparatus for severing successive longitudinal sections from continuously moving elongated work such as pipe, tube, rod and the like comprising a motor driven circular saw, guides for guiding the work in a normal path, a rotary support for said saw adapted to move said saw in a circular orbital path in a plane parallel to and approaching but not intersecting the normal path of the work, said rotary support comprising a pair of crank arms and a frame member carried by said crank arms and supporting the saw, means for periodically deflecting the work from its said normal path into the path of said saw comprising a pear-shaped cam driven at the same rotational speed as and in the opposite direction from the rotary support for the saw and disposed on the opposite side of the normal path of the work from the saw, the cam being positioned on its shaft so that the high point of the cam and the saw blade are always directly opposite each other, and means for periodically moving the cam shaft toward the path of the work to enable the cam to engage the work and deflect it into the path of the saw.

25. Apparatus according to claim 24 wherein the circumference of the cam is grooved to receive and guide the work.

26. Apparatus according to claim 25 wherein the highest point of the cam is notched to receive the saw during the cutting operation.

WILLIAM RODDER.

References Cited in the file of this patent

UNITED STATES PATENTS

| Number | Name | Date |
| --- | --- | --- |
| 572,374 | Richards | Dec. 1, 1896 |
| 1,620,546 | Grover | Mar. 8, 1927 |
| 1,681,306 | Moon | Aug. 21, 1928 |
| 1,817,996 | Maltby | Aug. 11, 1931 |
| 1,848,820 | Biggert | Mar. 8, 1932 |
| 1,923,261 | Garling | Aug. 22, 1933 |
| 1,984,039 | Siegert | Dec. 11, 1934 |
| 2,190,638 | Talbot | Feb. 13, 1940 |
| 2,332,013 | Rudert | Oct. 19, 1943 |
| 2,366,243 | Edwards | Jan. 2, 1945 |
| 2,452,343 | Wilson | Oct. 26, 1948 |
| 2,473,559 | Anderson | June 21, 1949 |

FOREIGN PATENTS

| Number | Country | Date |
| --- | --- | --- |
| 620,491 | France | Apr. 23, 1927 |